United States Patent [19]

Mayer

[11] 4,144,769
[45] Mar. 20, 1979

[54] ELECTRONIC COMPENSATION FOR TEMPERATURE VARIATION OF GYROSCOPE DAMPING

[75] Inventor: Arthur Mayer, Kew Gardens, N.Y.

[73] Assignee: Timex Corporation, Waterbury, Conn.

[21] Appl. No.: 762,230

[22] Filed: Jan. 24, 1977

[51] Int. Cl.² .................. G01C 19/04; G01P 3/00; G01L 19/04
[52] U.S. Cl. ............................... 74/5.5; 74/5 R; 73/497; 73/708
[58] Field of Search .................. 74/5 R, 5.6 E, 5.5; 73/497, 393

[56] References Cited

U.S. PATENT DOCUMENTS

| 2,837,913 | 6/1958 | Rich et al. ................. 73/59 |
| 3,597,983 | 8/1971 | Schwarzchild ............. 73/430 X |
| 3,813,946 | 6/1974 | Robbins, Jr. et al. ...... 74/5.6 E X |

Primary Examiner—Samuel Scott
Assistant Examiner—Don E. Ferrell
Attorney, Agent, or Firm—Lawrence Hager

[57] ABSTRACT

A signal compensator is combined with a second order system, for example, a fluid damped rate gyroscope, which produces a signal in response to the movements of a damped member for providing an output signal which is indicative of the input to the second order system and is unresponsive to variations of the (selected) damping (ratio) of the movable member.

3 Claims, 5 Drawing Figures

ELECTRONIC COMPENSATION FOR TEMPERATURE VARIATION OF GYROSCOPE DAMPING

BACKGROUND OF THE INVENTION

This invention relates generally to second order systems and, more particularly, transducers such as gyroscopes of the type employed in modern aircraft, guided missiles, and the like. It is particularly directed to the provision of electronic (signal) compensation for temperature caused variation of rate gyroscope damping.

Precision instruments of various kinds require damping in order to perform accurately, particularly gyroscopes, accelerometers, and other transducers wherein the movement of masses is utilized to measure velocity and other functions. A good example of the problem is found in the field of gyroscopes mounted within housings filled with oil or other liquid. Several different types of liquid damping systems have been developed, usually including vanes or blades attached to the moving mass and operating against the resistance offered by the liquid. Various combinations of valve-controlled passages and interconnected chambers provide means for varying the amount of damping in controlled fashion.

The most perplexing problem encountered is that which arises from the fact that the viscosity of fluids, such as silicone oils, varies with changes in ambient temperature. Any any variation in the viscosity of the damping fluid changes the damping ratio and thereby causes an inaccurate output signal indication of the function being measured, for example, the rate input to a rate gyroscope.

The prior art includes a number of temperature and/or damping compensation mechanisms to lessen the effects of changes in damping of a gyroscope in order to obtain a constant damping force such as is described in U.S. Pat. No. 2,955,472 issued Oct. 11, 1960 to Walter J. Krupick et al., U.S. Pat. No. 2,951,373 issued Sept. 6, 1960 to Thomas O. Summers, U.S. Pat. No. 2,839,931 issued June 24, 1958 to Harold W. Pope, U.S. Pat. No. 2,839,932 issued June 24, 1958 to Paul F. Hanna, U.S. Pat. No. 3,466,934 issued Sept. 16, 1969 to Kenneth E. Pinard, U.S. Pat. No. 2,839,933 issued June 24, 1958 to George J. Shapone, U.S. Pat. No. 3,241,376 issued Mar. 22, 1966 to Poket, U.S. Pat. No. 3,352,163 issued Nov. 14, 1967 to H. W. Boothroide. The abovementioned patents are mentioned as being representative of the prior art only and other pertinent patents may exist.

In all these prior art systems, however, complicated and costly mechanisms are required to compensate the damping ratio for changes caused by temperature variations. In contrast with the prior art, the present invention provides electronic means for directly compensating the output signal in proportion with damping variations caused by temperature and thereby substantially eliminates the prior art need for temperature or damping compensating mechanisms.

SUMMARY OF THE INVENTION

Generally speaking, in accordance with the invention, a circuit/means is combined with a second order system which produces a signal in response to the movements of a damped member for providing an output signal which is indicative of the input to the second order system and is unresponsive to damping variations.

It is an object of the present invention, therefore, to provide a second order system and circuit arrangement which produces a signal in response to the movements of a damped member wherein the signal is indicative of an input thereto and unresponsive to variations in the damping of the movable member.

It is a further object of the present invention to provide a signal compensator for a transducer which provides a signal in response to the movements of a fluid damped member wherein the signal is compensated for damping variations caused by temperature.

It is another object of the present invention to provide an improved viscous damped inertial guidance instrument capable of electronically compensating the output signal of the instrument to provide a compensated output signal whose amplitude and phase response is unaffected by possible changes in fluid viscosity.

It is another object of the present invention to provide an improved viscous damped rate gyroscope capable of electronically correcting the signal from the gyroscope to provide an output signal whose amplitude and phase response is unaffected by changes in temperature.

It is still a further object of the present invention to provide an improved rate gyroscope having an electronic circuit/means to compensate the output signal for temperature dependence of damping of a fluid damped spring restrained rate gyroscope to achieve an overall performance of approximately 0.7 ± 0.2 of critical damping over a temperature range of approximately −45° C. to +85° C., while keeping the natural frequency constant.

Further advantages and objectives of the present invention will be apparent from the following detailed description of the preferred embodiment of the invention. Like numerals refer to like devices/functions throughout.

BRIEF DESCRIPTION OF THE DRAWINGS

Referring now to FIG. 1, a block diagram is shown which depicts in a functional manner the signal compensator or system/network 1, 2 used in conjunction with a second order system 3, e.g., of the type which produces a signal $e_s$ in response to the movement of a damped member, for compensating the signal $e_s$ for damping variations such that an output signal $e_c$ is provided which is indicative of the input 4 and is unresponsive to or independent of variations of the selected damping factor of the second order system's 3 movable member.

The damping (variation) sensor 2 is physically attached to the system 3, but is functionally part of the signal compensator 1. It includes a variable element or device which is sensitive to the damping factor of the second order system 3 (or other property, for example, temperature, of the system 3 which is related to, influences, is controlled by or controls the damping) for varying the transfer function of the signal compensator 1, 2 as the second order system's damping factor varies.

The signal compensator 1, in response to damping variations indicated by the damping (variation) sensor 2, compensates or modifies or introduces a signal (voltage) component to the output signal $e_s$ of the second order system 3 so as to provide the compensated output signal $e_c$.

Generally, speaking, and in accordance with the present invention, the zeros of the transfer function of the signal compensator 1, 2 are made to cancel the variable poles of the second order system's 3 transfer function. The signal compensator's poles are invariant and they, instead of the (variable) poles of the second order system, determine the total system response to any input 4.

Figure 2:
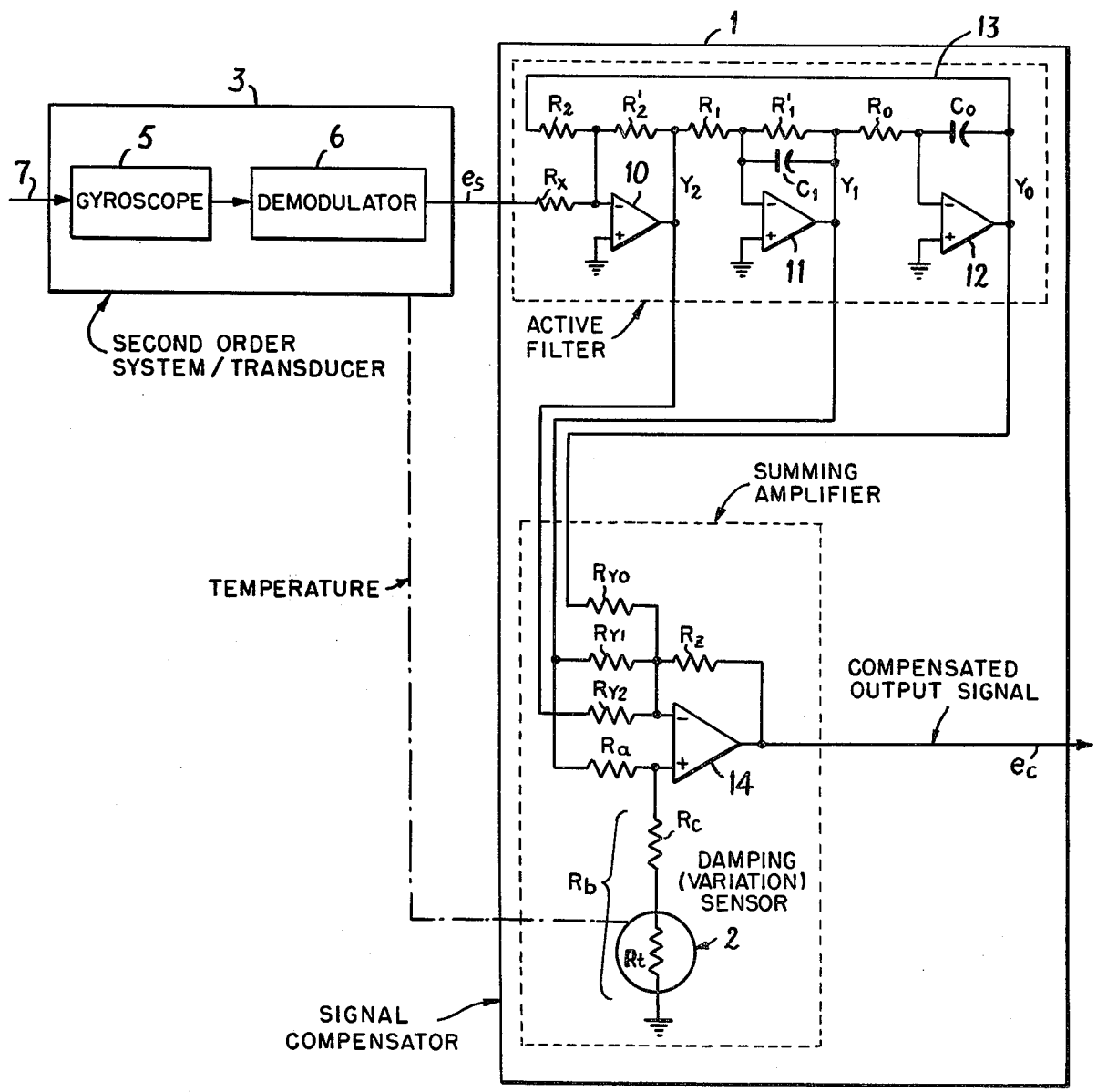
FIG. 2 is a schematic circuit diagram of the apparatus comprising the compensating means of the present invention.

Reference will now be made to FIG. 2 which illustrates the preferred embodiment of the present invention.

Figure 1:
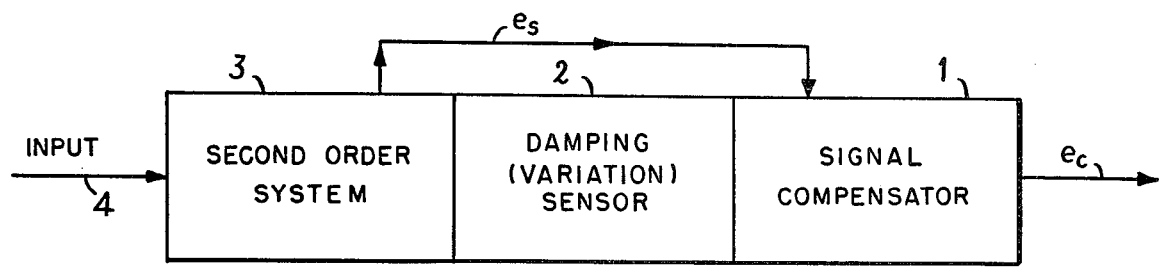
FIG. 1 is a block diagram showing the system/network for compensating the output of a second order system for damping/temperature variations in accordance with the present invention.

The preferred embodiment of the invention uses, for example, a single-degree-of-freedom fluid damped rate gyroscope 5 as the second order system 3 depicted in FIG. 1. The rate gyroscope 5 is a type of transducer which responds to an angular rate input 7 (radian/sec) with an output (voltage) signal. This output signal is an A.C. voltage, which by its amplitude and phase, indicates the magnitude and direction of the gimbal excursion, i.e., the movable member of the second order system. The output signal of the rate gyroscope 5 is coupled to the input of the demodulator 6. The demodulator 6, which does not form part of the invention, is used in the preferred embodiment of the invention to remove the A.C. carrier frequency. However, it should be recognized that the technique or concept of the present invention comprising other embodiments (not shown), e.g., second order systems not employing a carrier frequency, would not utilize the intermediary demodulator 6. In this background, the signal voltage $e_s$ will be referred to in the specification as being the output signal of the second order system or rate gyroscope 5.

As noted above, the rate gyroscope's 5 signal $e_s$ is influenced by variation in the damping caused, for example, by changes in temperature. The signal compensator 1, 2 shown in FIG. 2 is designed to compensate the rate gyroscope's 5 output signal $e_s$ for such influence; therefore, it provides a compensated output signal $e_c$ which is indicative of the rate input 7 and substantially independent of damping/temperature variations.

The signal compensator 1, 2 is designed to have a transfer function $G_c$, i.e., a ratio which relates the compensated output signal $e_c$ to the rate gyroscope signal $e_s$ by the relationship $G_c = e_c/e_s$, having component-terms which compensate for changes in the damping component-terms of the transfer function $G_s$ of the rate gyroscope 5 such that the transfer function $Y_s$ of the entire system/network comprising the combination of the rate gyroscope 5 and the signal compensator 1, 2 remains substantially constant with damping variations. The relationship of the entire system can be simply represented by the following:

$$Y_s = G_s \cdot G_c \qquad (1A)$$

where $Y_s$ is independent of damping variations. This relationship will be more fully explained in connection with the signal compensator 1, 2 shown in FIG. 2.

The damping ratio variations in the transfer function $G_s$ are dependent upon the temperature of the fluid damping system of the rate gyroscope 5. The relationship of the temperature with the damping factor makes it desirable, in accordance with the preferred embodiment of the present invention, to utilize a damping (variation) sensor 2 which is responsive to the temperature of the fluid damping system in order to make the compensating transfer function $G_c$ responsive to change in the damping ratio of the rate gyroscope 5. This is effected by providing the signal compensator 1, 2 with a transfer function which varies with temperature inversely as the transfer function of the rate gyroscope 5 such that the transfer function $Y_s$ of the combination of the rate gyroscope 5 with the signal compensator 1, 2 remains substantially constant over a wide temperature range.

The signal compensator 1 includes an active filter and a summing amplifier. Since active filters are known in the field such as is described in U.S. Pat. No. 3,987,370 issued Oct. 19, 1976 to Alan E. Schutz, and in "Active Filters" Wireless World, Mar. 1970, pp. 134–139, they, therefore, will not be described in detail herein to avoid prolixity. Briefly, however, the active filter includes three operational amplifiers 10, 11, 12 connected in a closed loop configuration which comprises resistors $R_2$, $R'_2$, $R_1$, $R'_1$, $R_0$ and capacitors $C_1$, $C_0$ and the feedback connection 13. Each of the operational amplifiers 10, 11, 12 have an inverting and non-inverting input indicated by a minus and a plus sign, respectively. The resistor $R_x$ couples the output signal $e_s$ of the rate gyroscope 5 to the inverting input of operational amplifier 10. The output signal voltage $Y_2$ of operational amplifier 10 is coupled via resistor $R_1$ to the inverting input of operational amplifier 11. The output signal voltage $Y_1$ of operational amplifier 11 is coupled via resistor $R_0$ to the inverting input of operational amplifier 12. Resistor $R'_2$ is connected between the output of operational amplifier 10 and its inverting input. Resistor $R'_1$ and capacitor $C_1$ are connected in parallel between the output of operational amplifier 11 and its inverting input. Capacitor $C_0$ is connected from the output of operational amplifier 12 to its inverting input. And the output signal voltage $Y_0$ of operational amplifier 12 is coupled via resistor $R_2$ to the inverting input of operational amplifier 10. The non-inverting inputs of operational amplifiers 10, 11 and 12 are connected to ground potential.

With the feedback connection 13 as shown in FIG. 2, i.e., with the output of the operational amplifier 12 coupled back to the inverting input of operational amplifier 10, and assuming the following relationship exist:

| | | |
|---|---|---|
| $R'_1 = R_1$ | $R_x = R_2$ | $T_0 = R_0 C_0$ |
| $R'_2 = R_2$ | $T_g = \dfrac{1}{2\pi f_g}$ | $T_1 = R_1 C_1$ |
| $R_{y0} = R_{y1} = R_{y2} = R_z$ | | $S$ = Laplace Operator | then the signal voltage $Y_2$ at the output of operational amplifier 10 can be represented as follows:

$$Y_2 = -Y_0 - e_s; \text{ and } Y_1 = \frac{-Y_2}{1 + T_1 S} \text{ and } Y_0 = \frac{-Y_1}{T_0 S}. \quad (1B)$$

The signal voltages $Y_0$, $Y_1$, $Y_2$ are coupled to the inverting input of operational amplifier 14, indicated by a minus sign, by means of a resistive network $R_{y0}$, $R_{y1}$ and $R_{y2}$ respectively. Resistor $R_z$ is a feedback resistor which couples the compensated output signal $e_c$ of operational amplifier 14 to the inverting input. The arrangement of resistors $R_{y0}$, $R_{y1}$, $R_{y2}$ and $R_z$ with the operational amplifier 14 as shown in FIG. 2 forms what is conventionally referred to as an Adder or Summing Amplifier. The voltage e- at the inverting input of operational amplifier 14, as is known, can be represented as follows:

$$e- = \frac{Y_0 + Y_1 + Y_2 + e_c}{4}. \quad (1C)$$

The damping (variation) sensor 2 comprises resistor $R_t$ which is a temperature responsive element, for example, a thermistor having a negative temperature coefficient, in heat exchange relationship (indicated by dot-dash line) with the temperature of the fluid damping means of the rate gyroscope 5. Resistor $R_t$ can be affixed by conventional means either inside or outside the case of the rate gyroscope 5.

The signal voltage $Y_1$ at the output of operational amplifier 11 is coupled via resistors $R_a$ and $R_c$ to the damping (variation) sensor 2. This arrangement results in a resistive network comprising resistors $R_a$, $R_c$ and $R_t$ being connected to the non-inverting input, indicated by a plus sign, of operational amplifier 14 in such a manner as to form a voltage divider network such that the voltage e+ at the non-inverting input of operational amplifier 14 can be represented as follows:

$$e+ = \frac{R_b}{R_a + R_b} \cdot Y_1 \quad (1D)$$

where $R_b = R_c + R_t$.

Amplifier 14 operates to make $e- = e+$, or $$Y_0 + Y_1 + Y_2 + e_c = \frac{4R_b}{R_a + R_b} \cdot Y_1 \quad (1E)$$

Equation (1E) may be combined with the three equations of (1B) to obtain the transfer function $G_c$ of the signal compensator:

$$G_c = \frac{e_c}{e_s} = \frac{1 + \frac{4}{1 + R_a/R_b} T_0 S + T_0 T_1 S^2}{1 + T_0 S + T_0 T_1 S^2} \quad (1F)$$

The middle term in the numerator of (1F) has a temperature-dependent coefficient because the resistance of $R_t$ is included in the resistance $R_b$.

Since the rate gyroscope 5 is a second order system, its transfer function $G_s$ can be represented mathematically by the following equation:

$$G_s = \frac{G_0}{1 + 2 D_g T_g S + T_g^2 S^2} \quad (1G)$$

where $f_g = 1/2\pi T_g$ is the undamped natural frequency, $D_g$ is the damping ratio of the rate gyroscope 5, S is the Laplace operator and $G_0$ is the low frequency (signal) gain of the rate gyroscope 5.

In accordance with the relationship (1A), and with the substitution therein of equations (1F) and (1G), the transfer function $Y_s$ of the entire system shown in FIG. 2 can be represented by the following expression:

$$Y_s = \frac{G_0}{1 + 2 D_g T_g S + T_g^2 S^2} \cdot \frac{1 + 2 D_e T_g S + T_g^2 S^2}{1 + 2 D_c T_g S + T_g^2 S^2} \quad (1H)$$

where:

$$D_e = \frac{2}{1 + \frac{R_a}{R_b}} \cdot \frac{T_0}{T_g}$$

$$D_c = \frac{1}{2} \frac{T_0}{T_g}$$

and $$T_1 = T_g^2/T_0.$$

It can be seen from expression (1H) that the signal compensating transfer function $G_c$ can be expressed as a fraction having a numerator polynomial which becomes equal to the demoninator polynomial of the transfer function $G_s$ of the rate gyroscope 5 when $D_e$ is equal to $D_g$. Therefore, the resistance values of $R_a$ and $R_c$ are selected in relation to the value of $R_t$, a thermistor whose resistance decreases as temperature increases, such that the factor $D_e$ is maintained substantially equal to the damping factor $D_g$ over a wide temperature range.

When the term $D_e$ is maintained exactly equal to the term $D_g$, the expression (1H) simplifies to:

$$Y_s = \frac{G_0}{1 + 2 D_c T_g S + T_g^2 S^2} \quad (1I)$$

where $D_c$ is constant and equal to the selected damping ratio for the entire system 1, 2, 3 of approximately 0.7 of critical damping.

When $D_e$ is only approximately equal to $D_g$, the entire system-transfer function $Y_s$ has an equivalent damping ratio $D_c + \Delta D$, where the deviation $\Delta D$ from the (invariant) $D_c$ is given by the formula $$\Delta D = \frac{1.89 (D_g - D_e)}{1 + 1.78 D_g D_e}. \quad (1J)$$

The signal compensator 1 shown in FIG. 2 provides the results indicated in tables 2 and 3 with the component values (which can be selected empirically or by calculation) listed in table 1.

Table 1

| | | |
|---|---|---|
| $f_g = 23$ Hz | $T_g = 6.9$ m-sec. | $R_0 = R_1 = R'_1 = 20$ k-ohms |
| $T_0 = 9.8$ m-sec. | $C_0 = 0.5$ microfarads | $R_{y0} = R_{y1} = R_{y2} = R_z = 20$ k-ohms |
| $T_1 = 4.9$ m-sec. | $C_1 = 0.25$ microfarads | $R_x = R_2 = R'_2 = 20$ k-ohms |
| Rate gyroscope (with demodulator) Mfg. Timex Corporation | | $R_a = 11.014$ k-ohms |

Table 1-continued

Model #SD-000 Series      $R_c = 0.523$ k-ohms

The thermistor $R_t$ material has a negative temperature coefficient of approximately $-3.9\%/°$ C. at 25° C. Values of $R_t$ at selected temperatures are given in table 2. Such thermistors are commercially available from, for example, Western Thermistor Corporation, Oceanside, California.

Table 2

$$D_e = \frac{2\sqrt{2}}{1 + \frac{R_a}{R_b}}$$

| T(° F) | $R_t$ (k-ohms) | $D_e$ |
|---|---|---|
| −40 | 22.00 | 1.90 |
| −4 | 7.42 | 1.185 |
| 32 | 2.85 | .663 |
| 68 | 1.22 | .387 |
| 100 | .620 | .266 |
| 140 | .290 | .195 |
| 185 | .137 | .160 |

Table 3

| t (° F.) | $D_e$ | $D_g$ | $\Delta D$ |
|---|---|---|---|
| −40 | 1.9 | 2.3 | .09 |
|  |  | 1.8 | −.03 |
| −4 | 1.18 | 1.22 | −.02 |
|  |  | .98 | −.12 |
| 32 | .66 | .71 | .05 |
|  |  | .59 | −.08 |
| 68 | .39 | .45 | .09 |
|  |  | .38 | −.02 |
| 100 | .27 | .33 | .10 |
|  |  | .27 | −.00 |
| 140 | .195 | .185 | −.02 |
|  |  | .165 | .01 |
| 185 | .160 | .132 | −.05 |

Figure 3:
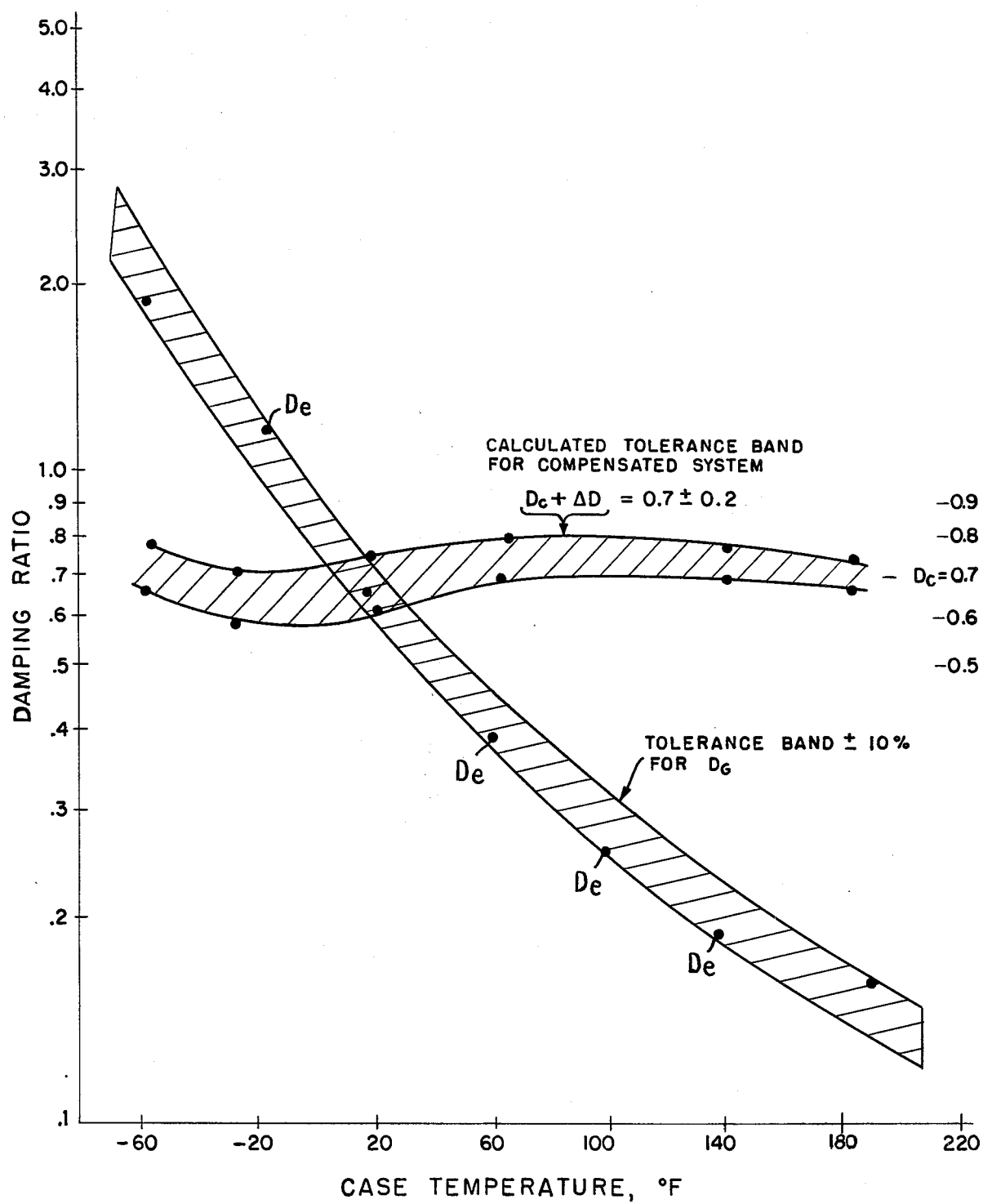
FIG. 3 is a graph by way of example of the system's damping ratio as a function of temperature.

Referring to FIG. 3, a graph is shown by way of example to illustrate how well the circuit of FIG. 2 compensates for temperature-induced damping variations in a rate gyroscope. The empirically determined damping curve, with a ± 10% tolerance band, shows that the uncompensated damping ratio $D_g$ may range (see table 3) from a high value of 2.3 at −40° F. to a low value of 0.132 at 185° F. The values of $D_e$ from table 2 are plotted in FIG. 3 as small circles, and they are all within the tolerance band of $D_g$.

The values of $D_e$ from table 2 have been used in the formula (1J), together with values of $D_g$ at the boundaries of the tolerance band, to calculate deviations $\Delta D$ from the nominal damping ratio $D_c$. These values of $\Delta D$ appear in table 3, and they have also been added to 0.7 to obtain a new tolerance band, as shown in FIG. 3, for the entire compensated system. As shown, the damping ratio $D_c + \Delta D$ of the entire system is confined between the extremes of 0.58 and 0.80.

Figure 4:
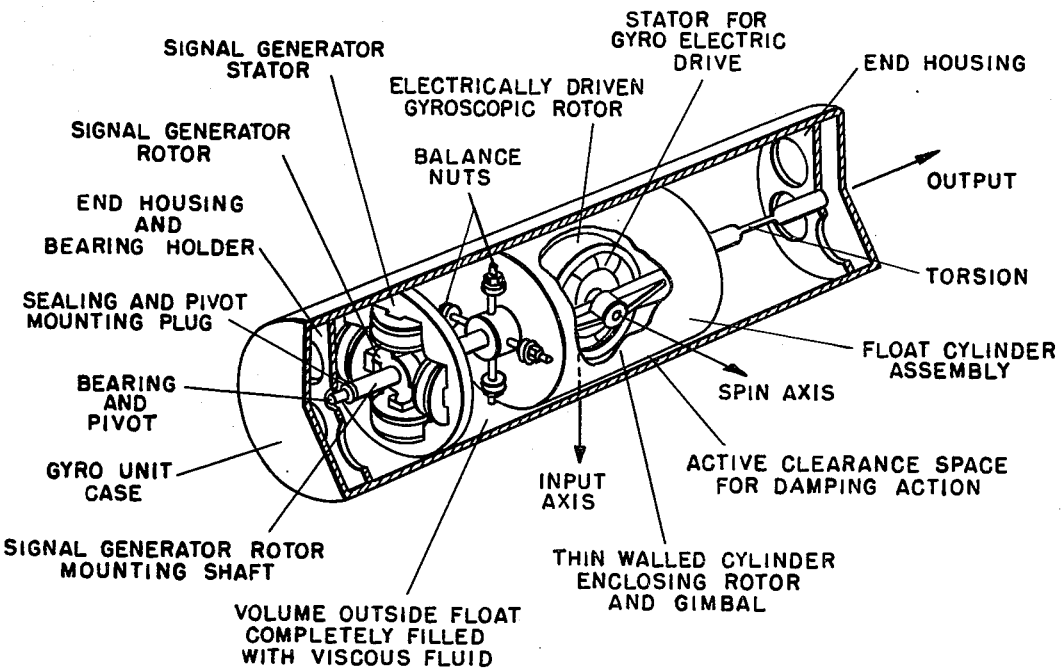
FIG. 4 is a cutaway view of a rate gyroscope for combining with the signal compensator of FIG. 2 in accordance with the preferred embodiment of the invention.

FIG. 4 shows a simplified cutaway drawing of a single-degree-of-freedom rate gyroscope. Since the details of such rate gyroscopes are well known in the field, they will not be described herein to avoid prolixity.

Figure 5:
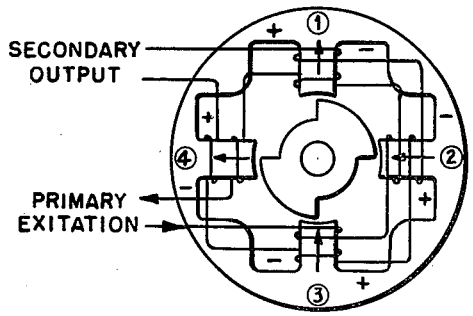
FIG. 5 is a schematic diagram of a (microsyn) signal generator.

FIG. 5 shows a simplified drawing of a (microsyn) signal generator. Since the details of such signal generators are also well known in the field, they will not be described herein in detail to avoid prolixity. Briefly, however, the microsyn signal generator is an electromagnetic, variable-reluctance device that produces an output voltage proportional to the product of current excitation, shaft (rate input) rotation and excitation frequency.

It can be seen that the basic concept of the present invention is to augment a damped second order system with signal processing means in such way as to compensate for possible variation of the system damping ratio. Therefore, while there has been shown what is considered to be the preferred embodiment of the invention, it is desired to secure in the appended claims all modifications as fall within the true spirit and scope of the invention.

I claim:

1. A fluid damped single-degree-of-freedom rate gyroscope and signal compensating means in combination comprising:
   a gimbal;
   a rotor supported within said gimbal with an axis of spin;
   a housing supporting said gimbal to permit its rotation about an axis perpendicular to said axis of spin in response to an angular rate input;
   a fluid within said housing surrounding said gimbal for damping movement thereof;
   means for producing an output signal which is proportional to the angular displacement of the gimbal; and
   a signal-compensating means responsive to damping variations and said output signal for providing a compensated signal indicative of said angular rate input and substantially unresponsive to damping variations caused by temperature, said signal-compensating means comprising an active filter circuit having a first amplifier with an input coupled to said output signal, a second amplifier having an input coupled to an output of said first amplifier, and a third amplifier having an input coupled to an output of said second amplifier and an output coupled to said input of said first amplifier in a closed loop configuration; a damping (variation) sensor responsive to the temperature of said fluid; and a summing amplifier having a first input coupled to the outputs of said first, second and third amplifiers and a second input coupled to said second amplifier and said damping (variation) sensor, and an output providing said compensated signal.

2. A fluid damped rate gyroscope and a signal-compensating means as in claim 1, wherein:
   the rate gyroscope has a transfer function $$\frac{G_0}{1 + 2 D_g T_g S + T_g^2 S^2},$$

where $D_g$ is the damping factor of the rate gyroscope and varies with temperature; and
   the signal-compensating means has a transfer function $$\frac{1 + 2 D_e T_g S + T_g^2 S^2}{1 + 2 D_c T_g S + T_g^2 S^2},$$

where the damping (variation) sensor causes $D_e$ to be substantially equal and vary as $D_g$ with temperature, and $D_c$ is a selected constant damping factor of the combination of the rate gyroscope and signal-compensating means.

3. A fluid damped single-degree-of-freedom rate gyroscope and signal compensating means in combination comprising:

a fluid damped single-degree-of-freedom rate gyroscope having a gimbal, a rotor supported within said gimbal with an axis of spin, a housing supporting said gimbal to permit its rotation about an axis perpendicular to said axis of spin in response to an angular rate input, a fluid within said housing surrounding said gimbal for damping movement thereof and means for producing an output singal which is proportional to the angular displacement of the gimbal wherein the rate gyroscope has a transfer function $$\frac{G_0}{1 + 2 D_g T_g S + T_g^2 S^2},$$

where $D_g$ is the damping factor of the rate gyroscope and varies with temperature; and a signal-compensating means comprising an active filter circuit having a first amplifier with an input coupled to said output signal, a second amplifier having an input coupled to an output of said first amplifier, and a third amplifier having an input coupled to an output of said second amplifier and an output coupled to said input of said first amplifier in a closed loop configuration responsive to damping variations and said output signal having a transfer function $$\frac{1 + 2 D_e T_g S + T_g^2 S^2}{1 + 2 D_c T_g S + T_g^2 S^2},$$

where the damping (variation) sensor causes $D_e$ to be substantially equal and vary as $D_g$ with temperature, and $D_c$ is a selected constant damping factor of the combination of the rate gyroscope and signal-compensating means for providing a compensated signal indicative of said angular rate input and substantially unresponsive to damping variations caused by temperature.

* * * * *